May 3, 1966  YOSHITSUGU HAMADA  3,249,095
COMBUSTION SYSTEM FOR DIESEL TYPE ROTARY ENGINES
Original Filed June 5, 1962  3 Sheets-Sheet 1

Inventor
Yoshitsugu Hamada
By Stevens, Davis, Miller & Mosher
Attorneys

May 3, 1966  YOSHITSUGU HAMADA  3,249,095
COMBUSTION SYSTEM FOR DIESEL TYPE ROTARY ENGINES
Original Filed June 5, 1962  3 Sheets-Sheet 2

Inventor
Yoshitsugu Hamada
By Stevens, Davis, Miller & Mosher
Attorneys

May 3, 1966 YOSHITSUGU HAMADA 3,249,095
COMBUSTION SYSTEM FOR DIESEL TYPE ROTARY ENGINES
Original Filed June 5, 1962 3 Sheets-Sheet 3

Inventor
Yoshitsugu Hamada
By Stevens, Davis, Miller & Mosher
Attorneys

United States Patent Office 3,249,095
Patented May 3, 1966

3,249,095
COMBUSTION SYSTEM FOR DIESEL TYPE ROTARY ENGINES
Yoshitsugu Hamada, Nishinomiya-shi, Japan, assignor to Yanmar Diesel Engine Co., Ltd., Osaka, Japan, a corporation of Japan
Continuation of application Ser. No. 200,169, June 5, 1962. This application Aug. 6, 1965, Ser. No. 482,982
Claims priority, application Japan, July 13, 1961, 36/24,397
1 Claim. (Cl. 123—8)

This is a continuation of my application Serial No. 200,169, filed June 5, 1962, now abandoned.

The present invention relates to a combustion system for a diesel-type rotary engine comprising a housing having a double epitrochoidal inner wall surface, a rotary shaft extending through said housing centrally thereof, and a triangular rotor mounted on an eccentric portion of said rotary shaft and adapted to rotate in the same direction as the rotary shaft at the ratio of 1 to 3 relative thereto with the three edges held in sliding contact with the inner peripheral surface of said housing.

With such engine, selection of the combustion system must be done taking into consideration the following points as the sealing elements disposed along the rotor edges slide over the inner wall surface of the engine housing:

(1) Where an auxiliary combustion chamber is provided in the engine housing, the sealing elements are subjected to excessive heat while passing high temperature regions such as the underside of the auxiliary combustion chamber or the orifice area thereof, frequently resulting in unsatisfactory sealing of the working chamber. Therefore, it is desirable to avoid the provision of an auxiliary combustion chamber in the housing.

(2) With higher compression ratios, manual starting of the engine is difficult unless a pressure reducing means is provided for the working chamber, and that, where such pressure reducing means is provided, the sealing between the working chambers tends to be unsatisfactory. Thus, a combustion chamber of such type is desirable as gives satisfactory starting and combustion characteristics with a relative low compression ratio.

(3) In high speed operation, a prolonged combustion period and throttling of the flow of compressed and combustion gases are undesirable for a satisfactory output and thermal efficiency.

In view of the above, direct injection is preferred as a combustion system of diesel-type rotary engines. Accordingly, the present invention is directed to the direct injection system as employed in view of the above considerations.

In general, with reciprocating-piston engines of the direct injection system, it is necessary for thorough mixing of the fuel and air to utilize the kinetic energy of the air as it is drawn or filled in thereby to form an air swirl or to provide a recess in the top of the respective piston so that the air filled in the cylinder will flow into the recess as it is compressed thereby to form a vortex. With diesel type rotary engines, however, any air swirl as described above cannot be obtained because of the arrangement of the suction ports and the shape of the working chambers and thus, with the direct injection type, it is necessary to utilize a vortex of the air flowing into a recess provided in the combustion chamber for the purpose of accelerating the mixing of the fuel with the air.

Accordingly, the present invention principally relates to a direct injection system and is directed to efficient utilization of an air vortex for efficient formation of a gaseous mixture. Other objects of the present invention include prevention of any loss in sealing between the working chambers due to the mounting of the fuel injection valve.

The present invention will now be described with reference to the accompanying drawings.

Figure 2:
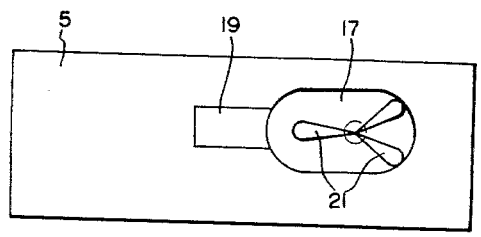
FIG. 2 is a view of the rotor as viewed in the direction of the arrow A in FIG. 1.

In the drawings, numeral 1 refers to the inner wall surface of the engine housing of double epitrochoidal configuration. Mounted therein is a rotary shaft 3 having a generally triangular rotor 5 mounted thereon by means of a bearing 7. Sealing elements 9 are arranged along the respective edges of the rotor for maintaining the airtightness between the working chambers. The remainder of the engine comprises a suction port 1, an exhaust port 3, and a fuel injection valve 15.

Figure 1:
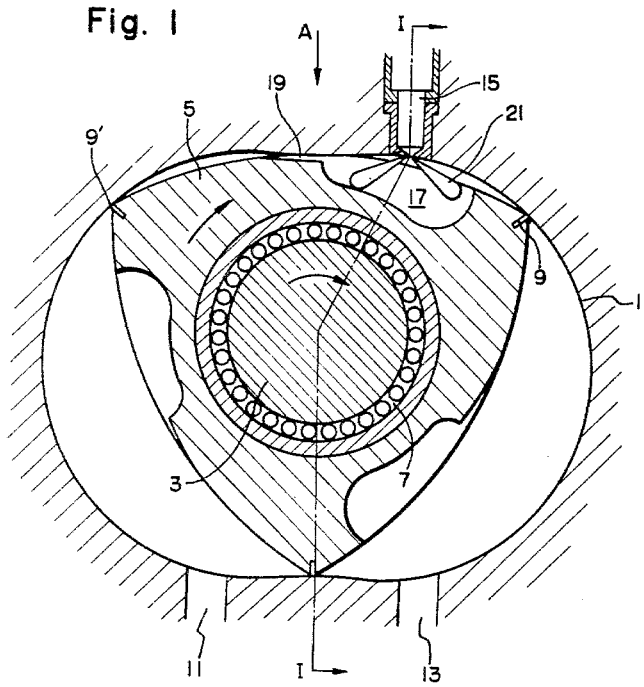
FIG. 1 is a transverse cross-sectional view of the engine.

Referring to FIGS. 1 and 2, numeral 17 denotes recesses or cavities formed in the rotor 5 for fuel combustion. A passageway 19 is formed in the rotor to interconnect each of the combustion cavities and one of neighboring sub-chambers separated by the adjacent model portion of the epitrochoidal inner wall surface when the volume of the associated working chamber is reduced to the minimum. The directions in which fuel is injected has been diagrammatically indicated and noted by reference numeral 21.

Figure 3:
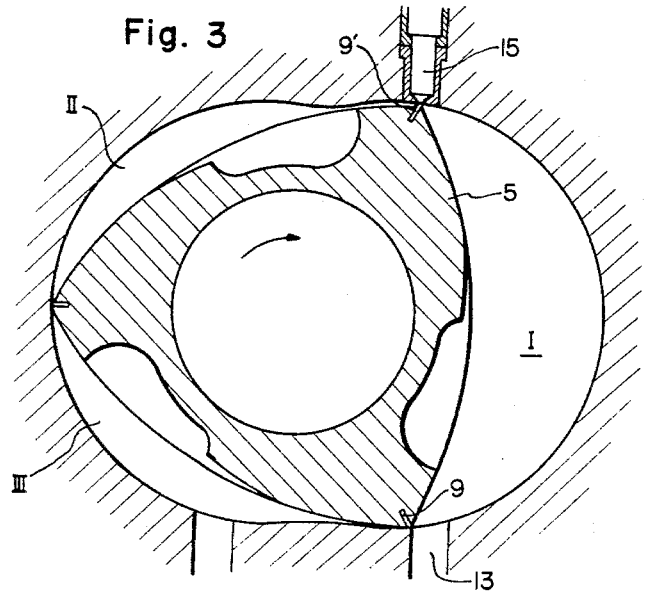
FIG. 3 is a transverse cross-sectional view of the engine illustrating the relative position of the fuel injection valve.

FIG. 3 illustrates the relative position of the rotor during or immediately after the exhaust "blow down" following the completion of the expansion stage of the working chamber I, as the rotor effects its planetary rotation in the direction of the arrow. As seen in this figure, the fuel injection valve 15 is located in the vicinity of one of the sealing elements 9′ of the rotor 5 in such position. At this time, the working chamber II is at the compression stage, the charge pressure in the working chamber II amounting to 5 times atmospheric pressure or thereabout. Since the fuel injection valve 15 is located such that the pressure in the working chamber I is slightly lower than that in the working chamber II when the sealing element 9′ is immediately below the fuel injection valve, the pressure difference between the working chambers I and II causes just a small part of the gaseous mixture in the working chamber II to flow into the working chamber I through a narrow passage adjacent the tip of the fuel injection valve 15. Such flow of the gaseous mixture effectively prevents any carbon deposit around the tip of the fuel injection valve 15 and "blow back" of the exhaust gas into the working chamber II thereby keeping the injection valve 15 from being overheated. Thus, satisfactory operation of the fuel injection valve is secured at all times.

Figure 4:
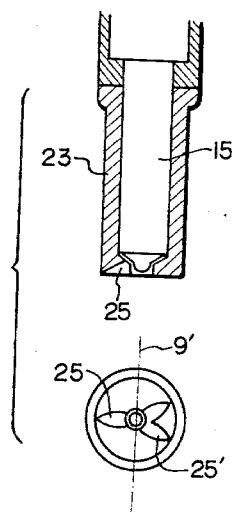
FIG. 4 represents a cross-sectional view and a bottom end view of the fuel injection valve and bushing shown in FIG. 1.

In FIG. 4, numeral 23 denotes a metal bushing force-fitted in the housing and adapted to fittingly receive the fuel injection valve 15. Recesses 25 and 25′ are formed in bushing 23 for passage therethrough of fuel jets ejected from the fuel injection valve 15. The chain line 9′ indicates the position of the longitudinal axis of the sealing element when it is directly below the fuel injection valve 15. Under these circumstances, the circulation of the gas charge in the working space is extremely limited because of the limited cross-sectional area of the flow passage. The circulation of the gas charge has substantially no influence upon the starting and power delivering characteristics of the engine.

Figure 5:
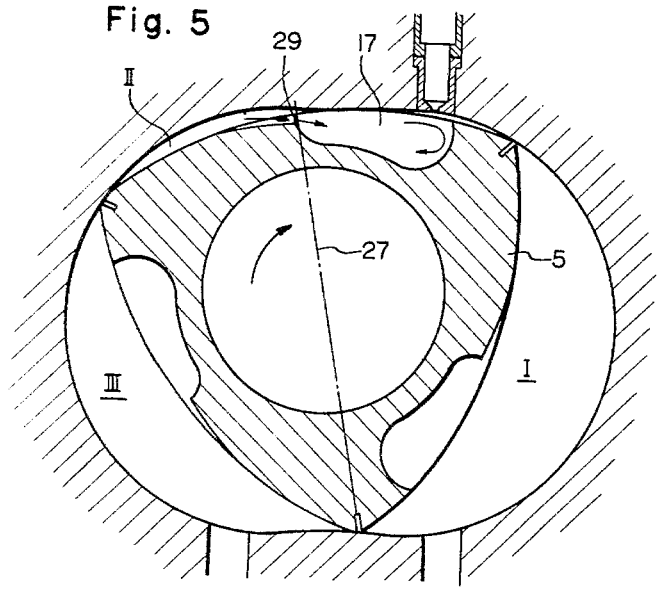
FIG. 5 is a diagrammatic view showing the operation.

With reference to FIG. 5, as the rotor 5 effects planetary rotation in the direction of the arrow, the gas charge continues to be compressed in the working chamber II. Meanwhile, as the gas charge is compressed, it flows into the combustion cavity 17. Where the cavity 17 is disposed, as shown, offset from the medial line 27 of the rotor toward the direction of rotor rotation with the inlet end 29 of the cavity disposed on the medial line, the cross section of the passage defined by the adjacent epitrochoidal inner wall of the housing and the edge of the inlet end 29 of the cavity becomes narrower as the rotor approaches its dead center position (as shown in FIG. 1). Therefore, the velocity of the gas charge flowing into the cavity 17 at the inlet end 29 thereof reaches its maximum in the vicinity of the dead center position of the rotor 5, when a violent vortex of the gas charge takes place in the cavity 17. Fuel is injected in the direction shown in FIGS. 1 and 2 into the cavity 17 immediately before the rotor has reached its dead center, and is aided by the violent vortex of the gas charge to form a gaseous mixture, thereby assuring efficient combustion of the fuel.

Figure 6:
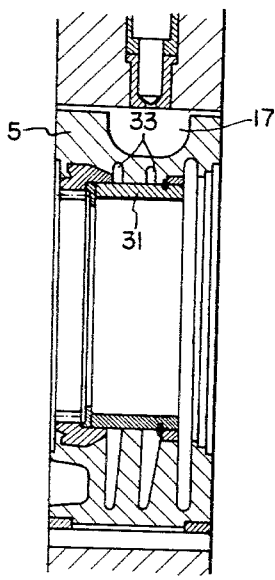
FIG. 6 is a cross-sectional view taken along the line I—I in FIG. 1.

Referring to FIG. 6, recesses 33 are provided for cooling oil in the rotor between the cavity 17 and a rotor bearing bushing 31. The recesses conducting cooling oil provide for appropriate heat dissipation of the highly heated walls of the combustion cavity 17, whereby undesirable heating and resulting thermal strains of the bearing bushing 31 is effectively avoided.

What is claimed is:

A combustion system for a direct injection type diesel rotary engine including a housing having a double lobe epitrochoidal inner wall surface and a rotor disposed about an axis, said rotor having a plurality of edges disposed circumferentially about said axis, sealing elements on each said edge in sliding contact with said inner wall surface, comprising a combustion cavity formed in each circumferential surface of the rotor intermediate said edges, said housing and rotor thereby forming a plurality of circumferentially disposed working chambers, inlet and exhaust ports sequentially communicating with said working chambers, a major portion of each said cavity being disposed on the side ahead of the medial line of the rotor, at least one passageway formed on each of said circumferential surfaces and extending from the trailing edge of said cavity toward the direction reverse to the rotor rotation, a bushing force-fitted into said housing adjacent to one of said sealing elements which separates a working chamber from the next following chamber when the rotor is in the position to be taken immediately after the exhaust port has opened to the preceding working chamber, fuel injection means fitted in said bushing, said bushing having in the tip portion a plurality of notches so that at least three fuel jets are ejected into said cavity, one of said jets being directed towards the direction opposite to the rotor rotation, and the remainder of said jets being directed nearly in the direction of rotor rotation thereby preventing "blow back" and keeping said fuel injection means free of carbon deposits.

No references cited.

SAMUEL LEVINE, *Primary Examiner.*

F. T. SADLER, *Assistant Examiner.*